US006673447B2

(12) United States Patent
Wei et al.

(10) Patent No.: US 6,673,447 B2
(45) Date of Patent: Jan. 6, 2004

(54) CATIONICALLY CHARGED COATING ON HYDROPHOBIC POLYMER FIBERS WITH POLY (VINYL ALCOHOL) ASSIST

(75) Inventors: Ning Wei, Roswell, GA (US); Robert John Lyng, Alpharetta, GA (US); Monica Graciela Varriale, Woodstock, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/053,068

(22) Filed: Jan. 18, 2002

(65) Prior Publication Data

US 2002/0122939 A1 Sep. 5, 2002

Related U.S. Application Data

(62) Division of application No. 09/216,087, filed on Dec. 18, 1998, now Pat. No. 6,537,614.

(51) Int. Cl.[7] .................. D02G 3/00; B32B 19/00; B01D 37/02; D21H 11/00; D21H 13/00; D21H 15/00; D21H 17/00

(52) U.S. Cl. ................ 428/375; 428/221; 428/357; 428/373; 210/193; 210/500.1; 162/164.2; 162/164.3

(58) Field of Search ................ 428/221, 373, 428/357, 375; 210/193, 500

(56) References Cited

U.S. PATENT DOCUMENTS

| | | | |
|---|---|---|---|
| 2,746,607 A | 5/1956 | Hess | 210/169 |
| 3,585,107 A | 6/1971 | Williams | 162/387 |
| 3,876,738 A | 4/1975 | Marinaccio et al. | 264/41 |
| 3,895,166 A | 7/1975 | Wood | 428/383 |
| 3,961,125 A | 6/1976 | Suminokura et al. | 428/261 |
| 3,979,285 A | 9/1976 | Wegmüller et al. | 210/36 |
| 4,007,113 A | 2/1977 | Ostreicher | 210/23 R |
| 4,007,114 A | 2/1977 | Ostreicher | 210/23 R |
| 4,162,348 A | 7/1979 | Juzu et al. | 428/474 |
| 4,230,573 A | 10/1980 | Kilty et al. | 210/767 |
| 4,235,764 A | 11/1980 | Dereser et al. | 260/29.6 NR |
| 4,238,329 A | 12/1980 | Zievers | 210/36 |
| 4,241,136 A | 12/1980 | Dereser | 428/378 |
| 4,273,892 A | 6/1981 | Rave | 525/180 |
| 4,282,261 A | 8/1981 | Greene | 426/330.4 |
| 4,288,462 A | 9/1981 | Hou et al. | 426/423 |
| 4,305,782 A | 12/1981 | Ostreicher et al. | 162/181 C |
| 4,309,247 A * | 1/1982 | Hou et al. | 162/149 |
| 4,321,288 A | 3/1982 | Ostreicher | 427/244 |
| 4,337,154 A | 6/1982 | Fukuchi et al. | 210/490 |
| 4,340,479 A | 7/1982 | Pall | 210/490 |
| 4,340,480 A | 7/1982 | Pall et al. | 210/490 |
| 4,361,619 A | 11/1982 | Forsten et al. | 428/234 |
| 4,366,068 A | 12/1982 | Ostreicher et al. | 210/767 |
| 4,399,245 A | 8/1983 | Kleber et al. | 524/108 |
| 4,415,664 A | 11/1983 | Barszcz et al. | 435/176 |
| 4,431,542 A | 2/1984 | Dingfors et al. | 210/502.1 |

(List continued on next page.)

FOREIGN PATENT DOCUMENTS

| | | | |
|---|---|---|---|
| DE | 19540876 A1 | 5/1997 | B01D/29/21 |
| EP | 0005536 B2 | 11/1979 | B01D/61/14 |
| EP | 0058978 A2 | 9/1982 | D06M/15/40 |
| EP | 0069435 A1 | 1/1983 | B01D/17/02 |
| EP | 0077633 A1 | 4/1983 | B01D/39/14 |
| EP | 0252477 A2 | 1/1988 | D06M/15/333 |
| EP | 0347755 A2 | 12/1989 | B01D/13/04 |

(List continued on next page.)

OTHER PUBLICATIONS

Derwent Info Ltd., English translation of abstract for JP 63–310,602 A, © 2000.
Derwent Info Ltd., English translation of abstract for JP 63–049,228 A, © 2000.
Derwent Info Ltd., English translation of abstract for JP 63–031,501 A, © 2000.
Derwent Info Ltd., English translation of abstract for JP 62–289,203 A, © 2000.
Derwent Info Ltd., English translation of abstract for JP 62–083,006 A, © 2000.

(List continued on next page.)

Primary Examiner—Deborah Jones
Assistant Examiner—Camie S Thompson
(74) Attorney, Agent, or Firm—Nelson Mullins Riley & Scarborough

(57) ABSTRACT

A hydrophobic polymer fiber having a cationically charged coating thereon, in which the coating includes a functionalized cationic polymer, such as an epichlorohydrin-functionalized polyamine or an epichlorohydrin-functionalized polyamido-amine, which has been crosslinked by heat. The present invention also provides a fibrous filter which includes hydrophobic polymer fibers having the foregoing cationically charged coating thereon. The present invention further provides a method of preparing a fibrous filter. The method involves providing a fibrous filter comprised of hydrophobic polymer fibers; treating the fibrous filter with an aqueous solution of a functionalized cationic polymer crosslinkable by heat under conditions sufficient to substantially coat the fibers with the functionalized cationic polymer, wherein the solution includes the functionalized cationic polymer, a poly(vinyl alcohol), a polar solvent for the poly(vinyl alcohol), and water; and treating the resulting coated fibrous filter with heat at a temperature and for a time sufficient to crosslink the functionalized cationic polymer present on the hydrophobic polymer fibers. The present invention additionally provides a method of preparing a fibrous filter. The method includes providing a fibrous filter comprised of hydrophobic polymer fibers; passing a solution of a functionalized cationic polymer crosslinkable by heat through the fibrous filter under conditions sufficient to substantially coat the fibers with the functionalized cationic polymer, wherein the solution includes the functionalized cationic polymer, a poly(vinyl alcohol), and water; and treating the resulting coated fibrous filter with heat at a temperature and for a time sufficient to crosslink the functionalized cationic polymer present on the hydrophobic polymer fibers.

3 Claims, No Drawings

U.S. PATENT DOCUMENTS

| | | | |
|---|---|---|---|
| 4,431,545 A | 2/1984 | Pall et al. | 210/641 |
| 4,445,195 A | 4/1984 | Yamamoto | 364/900 |
| 4,473,474 A * | 9/1984 | Ostreicher et al. | 210/636 |
| 4,473,475 A | 9/1984 | Barnes, Jr. et al. | 210/638 |
| 4,473,476 A | 9/1984 | McMillan et al. | 210/653 |
| 4,477,634 A | 10/1984 | Linder et al. | 525/327.1 |
| 4,523,995 A * | 6/1985 | Pall et al. | 210/504 |
| 4,555,313 A | 11/1985 | Duchane et al. | 204/3 |
| 4,594,158 A | 6/1986 | Chong et al. | 210/193 |
| 4,604,205 A | 8/1986 | Ayers | 210/497.2 |
| 4,604,208 A | 8/1986 | Chu et al. | 210/636 |
| 4,606,824 A | 8/1986 | Chu et al. | 210/635 |
| 4,608,173 A | 8/1986 | Watanabe et al. | 210/502.1 |
| 4,612,251 A | 9/1986 | Fredenucci et al. | 428/511 |
| 4,617,124 A | 10/1986 | Pall et al. | 210/638 |
| 4,617,128 A | 10/1986 | Ostreicher | 210/679 |
| 4,639,513 A | 1/1987 | Hou et al. | 530/387 |
| 4,645,567 A | 2/1987 | Hou et al. | 162/181.6 |
| 4,659,475 A * | 4/1987 | Liao et al. | 210/654 |
| 4,663,163 A | 5/1987 | Hou et al. | 424/101 |
| 4,673,504 A | 6/1987 | Ostreicher et al. | 210/500.22 |
| 4,676,904 A | 6/1987 | Schröder | 210/504 |
| 4,701,267 A | 10/1987 | Watanabe et al. | 210/806 |
| 4,702,840 A | 10/1987 | Degen et al. | 210/638 |
| 4,702,947 A | 10/1987 | Pall et al. | 428/36 |
| 4,707,266 A | 11/1987 | Degen et al. | 210/638 |
| 4,708,803 A | 11/1987 | Ostreicher et al. | 210/650 |
| 4,711,793 A | 12/1987 | Ostreicher et al. | 427/244 |
| 4,724,082 A | 2/1988 | Boom | 210/679 |
| 4,731,260 A | 3/1988 | Balding et al. | 427/236 |
| 4,734,208 A | 3/1988 | Pall et al. | 210/767 |
| 4,737,291 A | 4/1988 | Barnes, Jr. et al. | 210/638 |
| 4,743,418 A | 5/1988 | Barnes, Jr. et al. | 264/48 |
| 4,747,956 A | 5/1988 | Kiniwa | 210/679 |
| 4,765,915 A | 8/1988 | Diehl | 210/767 |
| 4,765,923 A | 8/1988 | Walterick, Jr. | 252/181 |
| 4,780,369 A | 10/1988 | Schnabel et al. | 428/398 |
| 4,798,615 A | 1/1989 | Fukuta et al. | 65/4.4 |
| 4,803,171 A | 2/1989 | Baier et al. | 436/530 |
| 4,810,567 A | 3/1989 | Calcaterra et al. | 428/224 |
| 4,810,576 A | 3/1989 | Gaa et al. | 428/391 |
| 4,833,011 A | 5/1989 | Horimoto | 428/288 |
| 4,853,431 A | 8/1989 | Miller | 524/608 |
| 4,859,340 A | 8/1989 | Hou et al. | 210/502.1 |
| 4,876,036 A | 10/1989 | Candau et al. | 252/637 |
| 4,888,115 A | 12/1989 | Marinaccio et al. | 210/636 |
| 4,895,685 A | 1/1990 | Honda et al. | 264/45.5 |
| 4,908,137 A | 3/1990 | Chen et al. | 210/679 |
| 4,915,839 A | 4/1990 | Marinaccio et al. | 210/500.23 |
| 4,925,572 A | 5/1990 | Pall | 210/767 |
| 4,936,998 A | 6/1990 | Nishimura et al. | 210/638 |
| 4,944,879 A | 7/1990 | Steuck | 210/500.27 |
| 4,946,603 A | 8/1990 | Laugharn et al. | 210/807 |
| 4,950,549 A | 8/1990 | Rolando et al. | 428/500 |
| 4,981,591 A | 1/1991 | Ostreicher | 210/502.1 |
| 5,004,543 A | 4/1991 | Pluskal et al. | 210/490 |
| 5,039,797 A | 8/1991 | Clack et al. | 528/405 |
| 5,049,275 A | 9/1991 | Gillberg-LaForce et al. | 210/500.27 |
| 5,049,282 A | 9/1991 | Linder et al. | 210/651 |
| 5,059,654 A | 10/1991 | Hou et al. | 525/54.1 |
| 5,085,780 A | 2/1992 | Ostreicher | 210/683 |
| 5,085,784 A | 2/1992 | Ostreicher | 210/767 |
| 5,089,134 A | 2/1992 | Ando et al. | 210/496 |
| 5,091,102 A | 2/1992 | Sheridan | 252/91 |
| 5,094,749 A | 3/1992 | Seita et al. | 210/321.75 |
| 5,106,501 A | 4/1992 | Yang et al. | 210/266 |
| 5,114,585 A | 5/1992 | Kraus et al. | 210/490 |
| 5,128,041 A | 7/1992 | Degen et al. | 210/638 |
| 5,133,878 A | 7/1992 | Gsell et al. | 210/767 |
| 5,137,633 A | 8/1992 | Wang | 210/490 |
| 5,147,553 A * | 9/1992 | Waite | 210/654 |
| 5,151,189 A | 9/1992 | Hu et al. | 210/635 |
| 5,160,627 A | 11/1992 | Cussler et al. | 210/639 |
| 5,178,766 A | 1/1993 | Ikeda et al. | 210/652 |
| 5,186,835 A | 2/1993 | Masuoka et al. | 210/500.36 |
| 5,202,025 A | 4/1993 | Onishi et al. | 210/500.35 |
| 5,209,849 A | 5/1993 | Hu et al. | 210/490 |
| RE34,296 E | 6/1993 | Roesink et al. | 521/50 |
| 5,227,481 A | 7/1993 | Tsai et al. | 536/18.7 |
| 5,234,991 A | 8/1993 | Tayot et al. | 525/54.1 |
| 5,269,931 A | 12/1993 | Hu et al. | 210/635 |
| 5,277,812 A | 1/1994 | Hu et al. | 210/500.41 |
| 5,288,403 A | 2/1994 | Ohno | 210/508 |
| 5,292,439 A | 3/1994 | Morita et al. | 210/638 |
| 5,298,165 A | 3/1994 | Oka et al. | 210/645 |
| 5,328,749 A * | 7/1994 | Noda et al. | 428/195 |
| 5,344,560 A | 9/1994 | Sugo et al. | 210/500.23 |
| 5,344,620 A | 9/1994 | Reiners et al. | 427/288 |
| 5,346,725 A | 9/1994 | Targosz | 427/389.9 |
| 5,350,443 A | 9/1994 | von Blucher et al. | 96/135 |
| 5,350,523 A | 9/1994 | Tomoi et al. | 210/683 |
| 5,393,379 A | 2/1995 | Parrinello | 162/101 |
| 5,407,581 A | 4/1995 | Onodera et al. | 210/654 |
| 5,425,877 A | 6/1995 | Knappe | 210/493.4 |
| 5,436,068 A | 7/1995 | Kobayashi et al. | 428/308.4 |
| 5,438,127 A | 8/1995 | Woodard et al. | 536/25.4 |
| 5,439,564 A | 8/1995 | Shimizu et al. | 204/102 |
| 5,456,843 A | 10/1995 | Koenhen | 210/651 |
| 5,460,945 A | 10/1995 | Springer et al. | 435/7.24 |
| 5,472,600 A | 12/1995 | Ellefson et al. | 210/317 |
| 5,494,744 A | 2/1996 | Everhart et al. | 427/337 |
| 5,503,745 A | 4/1996 | Ogata et al. | 210/490 |
| 5,510,004 A | 4/1996 | Allen | 162/168.2 |
| 5,531,893 A | 7/1996 | Hu et al. | 210/500.35 |
| 5,543,054 A | 8/1996 | Charkoudian et al. | 210/638 |
| 5,547,576 A | 8/1996 | Onishi et al. | 210/500.37 |
| H1613 H | 11/1996 | Espy | 528/489 |
| 5,571,657 A | 11/1996 | Szmanda et al. | 430/270.1 |
| 5,575,892 A * | 11/1996 | Devore et al. | 162/164.3 |
| 5,578,243 A | 11/1996 | Mazaki et al. | 252/299.01 |
| 5,618,622 A * | 4/1997 | Gillberg-Laforce et al. | 428/357 |
| 5,643,375 A | 7/1997 | Wilfong et al. | 156/244.24 |
| 5,647,985 A | 7/1997 | Ung-Chhun et al. | 210/504 |
| 5,650,479 A | 7/1997 | Glugla et al. | 528/194 |
| 5,652,050 A | 7/1997 | Pall et al. | 442/394 |
| 5,665,235 A | 9/1997 | Gildersleeve et al. | 210/503 |
| 5,679,248 A | 10/1997 | Blaney | 210/315 |
| 5,688,588 A | 11/1997 | Cotton et al. | 428/305.5 |
| 5,709,798 A | 1/1998 | Adiletta | 210/651 |
| 5,711,878 A | 1/1998 | Ogata et al. | 210/490 |
| 5,714,073 A | 2/1998 | Pall et al. | 210/651 |
| 5,721,031 A | 2/1998 | Echigo et al. | 428/36.4 |
| 5,736,051 A | 4/1998 | Degen et al. | 210/650 |
| 5,738,788 A | 4/1998 | Tokiwa et al. | 210/507 |
| 5,743,940 A | 4/1998 | Sugo et al. | 95/285 |
| 5,762,797 A | 6/1998 | Patrick et al. | 210/497.1 |
| 5,776,353 A | 7/1998 | Palm et al. | 210/777 |
| 5,783,094 A | 7/1998 | Kraus et al. | 210/767 |
| 5,785,844 A | 7/1998 | Lund et al. | 210/85 |
| 5,795,483 A | 8/1998 | Ung-Chhun et al. | 210/645 |
| 5,830,367 A | 11/1998 | Gadsby | 210/739 |
| 5,846,438 A | 12/1998 | Pall et al. | 210/767 |
| 5,855,788 A | 1/1999 | Everhart et al. | 210/653 |
| 5,858,503 A | 1/1999 | Everhart et al. | 428/131 |
| 5,863,654 A | 1/1999 | Frey et al. | 428/375 |
| 5,869,152 A | 2/1999 | Colon | 428/34.4 |
| 5,882,517 A * | 3/1999 | Chen et al. | 210/496 |
| 5,895,575 A | 4/1999 | Kraus et al. | 210/483 |
| 5,954,962 A | 9/1999 | Adiletta | 210/490 |
| 5,958,989 A | 9/1999 | Wang et al. | 521/64 |

| | | | | |
|---|---|---|---|---|
| 5,979,670 A | 11/1999 | Ditter et al. | | 210/489 |
| 5,980,709 A | 11/1999 | Hodges et al. | | 204/409 |
| 6,045,694 A | 4/2000 | Wang et al. | | 210/500.37 |
| 6,274,041 B1 * | 8/2001 | Williamson et al. | | 210/243 |
| 6,376,578 B1 * | 4/2002 | Gorzynski et al. | | 523/420 |
| 6,457,589 B1 * | 10/2002 | Poirier et al. | | 210/459 |

FOREIGN PATENT DOCUMENTS

| | | | |
|---|---|---|---|
| EP | 0496218 A2 | 7/1992 | D06P/1/52 |
| EP | 0606646 B1 | 7/1994 | A61M/1/36 |
| EP | 0792677 A1 | 9/1997 | B01D/39/16 |
| EP | 0811412 A1 | 12/1997 | B01D/39/16 |
| GB | 2043734 A | 10/1980 | D21H/3/58 |
| GB | 2056485 A | 3/1981 | C12H/1/02 |
| WO | WO 90/11814 | 10/1990 | B01D/39/16 |
| WO | WO 93/22039 | 11/1993 | B01D/69/12 |
| WO | WO 96/32178 | 10/1996 | B01D/24/00 |
| WO | WO 97/16233 | 5/1997 | B01D/29/21 |
| WO | WO 97/28882 | 8/1997 | B01D/39/08 |
| WO | WO 97/41960 | 11/1997 | B03C/5/00 |
| WO | WO 98/01208 | 1/1998 | B01D/39/00 |
| WO | WO 98/04335 | 2/1998 | B01D/39/18 |
| WO | WO 98/32705 | 7/1998 | C02F/9/00 |
| WO | WO 00/09797 | 2/2000 | D06M/14/26 |
| ZA | 97/5944 | 4/1998 | |

OTHER PUBLICATIONS

Derwent Info Ltd., English translation of abstract for JP 62–007,401 A, © 2000.

English translation for JP 60–058,221 © JPO.

Derwent Info Ltd., English translation of abstract for JP 11–279,945 A, © 2000.

Derwent Info Ltd., English translation of abstract for JP 10–279,713 A, © 2000.

Derwent Info Ltd., English translation of abstract for JP 9–235,399 A, © 2000.

Derwent Info Ltd., English translation of abstract for JP 4–284,853 A, © 2000.

Derwent Info Ltd., English translation of abstract for JP 4–035,728 A, © 2000.

Derwent Info Ltd., English translation of abstract for JP 4–029,730 A, © 2000.

Derwent Info Ltd., English translation of abstract for JP 4–029,729 A, © 2000.

Derwent Info Ltd., English translation of abstract for JP 3–293,008 A, © 2000.

Derwent Info Ltd., English translation of abstract for JP 2–212,527 A, © 2000.

Derwent Info Ltd., English translation of abstract for JP 2–187,136 A, © 2000.

Derwent Info Ltd., English translation of abstract for JP 1–224,009 A, © 2000.

Derwent Info Ltd., English translation of abstract for JP 1–224,004 A, © 2000.

Derwent Info Ltd., English translation of abstract for JP 1–201,582 A, © 2000.

Derwent Info Ltd., English translation of abstract for JP 1–199,614 A, © 2000.

Derwent Info Ltd., English translation of abstract for JP 1–070,108 A, © 2000.

Derwent Info Ltd., English translation of abstract for JP 1–004,212 A, © 2000.

Billmeyer, Jr., Fred W., *Textbook of Polymer Science* © 1962 by John Wiley & Sons, Inc., U.S.A., pp. 368–371.

* cited by examiner

CATIONICALLY CHARGED COATING ON HYDROPHOBIC POLYMER FIBERS WITH POLY (VINYL ALCOHOL) ASSIST

This application is a divisional of application application Ser. No. 09/216,087 filed on Dec. 18, 1998 now U.S. Pat. No. 6,537,614.

BACKGROUND OF THE INVENTION

The present invention relates to filter materials. More particularly, the present invention relates to charge-modified filters.

Charge-modified filters are known in the art. They typically consist of microporous membranes or involve the use of materials which are blends of glass fibers and cellulose fibers or blends of cellulose fibers and siliceous particles. Charge modification generally was accomplished by coating the membrane or at least some of the fibers with a charge-modifying agent and a separate crosslinking agent in order to ensure the durability of the coating.

While microporous membranes generally are capable of effective filtration, flow rates through the membrane typically are lower than for fibrous filters. Moreover, microporous membranes also generally have higher back pressures during the filtration process than do fibrous filters. Accordingly, there is a need for fibrous filters having effective filtration capabilities for charged particles. Moreover, there also is a need for fibrous filters composed of glass fibers, without the need for cellulosic fibers or siliceous particles.

Apertured films, woven fabrics and nonwoven materials have been used as filter sheets for removing or separating particles from liquids. Such filter sheets generally rely on some form of mechanical straining or physical entrapment. Such filter sheets can pose limitations when the size of the particle to be removed is small relative to the average pore diameter of the filter sheet. For nonwoven materials, this is particularly true for particles of less than one micrometer in diameter.

Improved filters have been developed with modified surface charge characteristics to capture and adsorb particles by electrokinetic interaction between the filter surface and particles contained in an aqueous liquid. Such charge-modified filters typically consist of microporous membranes or involve the use of materials which are blends of glass fibers and cellulose fibers or blends of cellulose fibers and siliceous particles. Charge modification generally was accomplished by coating the membrane or at least some of the fibers with a charge-modifying agent and a separate crosslinking agent in order to ensure the durability of the coating.

While microporous membranes generally are capable of effective filtration, flow rates through the membrane typically are lower than for fibrous filters. Moreover, microporous membranes also generally have higher back pressures during the filtration process than do fibrous filters.

The use of fibers prepared from synthetic polymers is desirable because such fibers are inexpensive and they can be formed into nonwoven webs having porosities which are appropriate for the filtration of particles from a fluid stream. Many of such synthetic polymers, however, are hydrophobic, a characteristic which makes it difficult to durably coat fibers prepared from such polymers with a charge-modifying material. Accordingly, opportunities exist for improved charge-modified filter materials which are based on hydrophobic polymer fibers.

Stated differently, it would be desirable if certain inexpensive materials could be used to produce filters having modified surface charge characteristics for filtering very fine particles from aqueous liquids. For example, polyolefins are widely used in the manufacture of sheets of apertured films, woven fabrics, and nonwoven materials. Many types of polyolefin sheets tend to be hydrophobic and relatively inert. That is, the low surface free energy of polyolefins (e.g., polypropylene) and their relatively chemically inert natures render many unmodified polyolefins ill-suited for filter sheet applications in which a modified surface charge is desired for removing particles from an aqueous liquid. For example, many chemical charge modifiers (e.g., cationic resins, charged particles, etc.) adhere poorly, if at all, to conventional unmodified, hydrophobic polyolefin sheets.

In the past, chemical coatings and/or internal additives have been added to filter sheets made of inexpensive materials to impart desired properties. Many of these coatings and/or additives present problems related to cost, effectiveness, durability and/or the environment.

It has been proposed that biofunctional materials (e.g., proteins) can be deposited from solutions onto different substrates (i.e., sheets of materials) to modify the surface properties of the substrates and/or serve as a functionalized surface that can be chemically reactive. However, many of the economically desirable substrates (e.g., substrates formed of polymers such as polyolefins) have surfaces that are unsuitable for the rapid and inexpensive deposition of biofunctional materials, especially when durable, tightly bound coatings of satisfactory adherence are desired., Even if inexpensive, durable, tenacious coatings could be adhered to an economically desirable substrate, coatings composed solely of biofunctional materials (e.g., proteins) may have limitations, especially if the coatings lacked the desired chemical characteristics such as, for example, modified surface charge characteristics.

Thus, there is still a need for a practical and inexpensive chemically charged modified filter for removing micron to sub-micron sized charged particles from an aqueous liquid. A need exists for such a filter formed from an unmodified, relatively inert, hydrophobic substrate such as, for example, an unmodified, relatively inert, polyolefin substrate. A need also exists for a method of removing charged, micron to sub-micron sized particles from aqueous liquids utilizing a practical and inexpensive chemically charge modified filter such as, for example, a chemically charge-modified filter formed from an unmodified, relatively inert, polyolefin substrate.

In addition to the needs described above, there is a need for a simple, practical and inexpensive chemically charge-modified filter for removing waterborne pathogens from aqueous liquid. This need also extends to a simple method for removing waterborne pathogens from aqueous liquids utilizing a practical and inexpensive chemically charge-modified filter.

One phenomenon observed with some filters having a modified surface charge characteristic is that the filters have different filtration efficiencies for different types of waterborne pathogens, such as, for example, different types of bacteria. That is, some filters having modified surface charges provide acceptable removal of some types of waterborne pathogens (e.g., some types of bacteria), but not others. The nature of this affinity appears to be difficult to predict. Since even relatively small differences in waterborne pathogen removal efficiency can be important, the discovery that a filter or filter system has an unpredictably strong affinity for a waterborne pathogen would be both unexpected and highly desirable, especially if the filter can be used to produce potable water. Meeting this need is important because removing waterborne pathogens from aqueous liquids in a practical and inexpensive manner remains a challenge in many parts of the world.

SUMMARY OF THE INVENTION

The present invention addresses some of the difficulties and problems discussed above by providing a hydrophobic polymer fiber having a cationically charged coating thereon, in which the coating includes a functionalized cationic polymer which has been crosslinked by heat. By way of example, the functionalized cationic polymer may be an epichlorohydrin-functionalized polyamine. As another example, the functionalized cationic polymer may be an epichlorohydrin-functionalized polyamido-amine.

The present invention also provides a fibrous filter which includes hydrophobic polymer fibers having a cationically charged coating thereon. The coating includes a functionalized cationic polymer which has been crosslinked by heat. As before, the functionalized cationic polymer is an epichlorohydrin-functionalized polyamine or an epichlorohydrin-functionalized polyamido-amine.

The present invention further provides a method of preparing a fibrous filter. The method involves providing a fibrous filter comprised of hydrophobic polymer fibers; treating the fibrous filter with an aqueous solution of a functionalized cationic polymer crosslinkable by heat under conditions sufficient to substantially coat the fibers with the functionalized cationic polymer, wherein the solution comprises the functionalized cationic polymer, a poly(vinyl alcohol), a polar solvent for the poly(vinyl alcohol), and water; and treating the resulting coated fibrous filter with heat at a temperature and for a time sufficient to crosslink the functionalized cationic polymer present on the hydrophobic polymer fibers. By way of example, the functionalized cationic polymer may be an epichlorohydrin-functionalized polyamine or an epichlorohydrin-functionalized polyamido-amine. Without wishing to be bound by theory, it is believed that the poly(vinyl alcohol) alters the normally hydrophobic surfaces of the fibers to an extent sufficient to promote the coating of the fibers by the functionalized cationic polymer. In addition, it is believed that some of the hydroxy groups present in the poly(vinyl alcohol) can crosslink with reactive groups present in the functionalized cationic polymer (such as epoxy groups) to form a durable, positively charged coating on the fibers.

The present invention additionally provides a method of preparing a fibrous filter. The method includes providing a fibrous filter comprised of hydrophobic polymer fibers; passing a solution of a functionalized cationic polymer crosslinkable by heat through the fibrous filter under conditions sufficient to substantially coat the fibers with the functionalized cationic polymer, wherein the solution includes the functionalized cationic polymer, a poly(vinyl alcohol), and water; and treating the resulting coated fibrous filter with heat at a temperature and for a time sufficient to crosslink the functionalized cationic polymer present on the hydrophobic polymer fibers. Again, the functionalized cationic polymer may be an epichlorohydrin-functionalized polyamine or an epichlorohydrin-functionalized polyamido-amine.

DETAILED DESCRIPTION OF THE INVENTION

The term "hydrophobic polymer" is used herein to mean any polymer resistant to wetting, or not readily wet, by water, i.e., having a lack of affinity for water. A hydrophobic polymer typically will have a surface free energy of about 40 dynes/cm ($10^{-5}$ newtons/cm or N/cm) or less. Examples of hydrophobic polymers include, by way of illustration only, polyolefins, such as poylethylene, poly(isobutene), poly(isoprene), poly(4-methyl-1-pentene), polypropylene, ethylene-propylene copolymers, and ethylenepropylene-hexadiene copolymers; ethylene-vinyl acetate copolymers; styrene polymers, such as poly(styrene), poly(2-methylstyrene), styrene-acrylonitrile copolymers having less than about 20 mole-percent acrylonitrile, and styrene-2,2,3,3,-tetrafluoro-propyl methacrylate copolymers; halogenated hydrocarbon polymers, such as poly(chlorotrifluoroethylene), chlorotrifluoroethylene-tetrafluoroethylene copolymers, poly(hexafluoropropylene), poly(tetrafluoroethylene), tetrafluoroethylene-ethylene copolymers, poly(trifluoroethylene), poly(vinyl fluoride), and poly(vinylidene fluoride); vinyl polymers, such as poly(vinyl butyrate), poly(vinyl decanoate), poly(vinyl dodecanoate), poly(vinyl hexadecanoate), poly(vinyl hexanoate), poly(vinyl propionate), poly(vinyl octanoate), poly(heptafluoroisopropoxyethylene), 1-heptafluoroisopropoxy-methylethylene-maleic acid copolymers, poly(heptafluoroisopropoxypropylene), poly(methacrylonitrile), poly(vinyl alcohol), poly(vinyl butyral), poly(ethoxyethylene), poly(methoxy-ethylene), and poly(vinyl formal); acrylic polymers, such as poly(n-butyl acetate), poly(ethyl acrylate), poly[(1-chlorodifluoromethyl) tetrafluoroethyl acrylate], poly[di(chloro-fluoromethyl) fluoromethyl acrylate], poly(1,1-dihydroheptafluorobutyl acrylate), poly(1,1-dihydropentafluoroisopropyl acrylate), poly(1,1-dihydropentadeca-fluorooctyl acrylate), poly(heptafluoroisopropyl acrylate), poly[5-(heptafluoroiospropoxy)-pentyl acrylate], poly[11-(heptafluoroiospropoxy)undecyl acrylate], poly[2-(heptafluoropropoxy)ethyl acrylate], and poly(nonafluoroisobutyl acrylate); methacrylic polymers, such as poly(benzyl methacrylate), poly(n-butyl methacrylate), poly(isobutyl meth-acrylate), poly(t-butyl methacrylate), poly(t-butylaminoethyl methacrylate), poly(dodecyl methacrylate), poly(ethyl methacrylate), poly(2-ethylhexyl methacrylate), poly(n-hexyl methacrylate), poly(dimethylaminoethyl methacrylate), poly(hydroxyethyl methacrylate), poly(phenyl methacrylate), poly(n-propyl methacrylate), poly(octadecyl methacrylate), poly(1,1-dihydropentadecafluorooctyl methacrylate), poly(heptafluoroisopropyl methacrylate), poly(heptadecafluorooctyl methacrylate), poly(1-hydrotetrafluoroethyl methacrylate), poly(1,1-dihydrotetrafluoropropyl methacrylate), poly(1-hydrohexafluoroisopropyl methacrylate), and poly(t-nonafluorobutyl methacrylate); polyethers, such as poly(chloral), poly(oxybutene)diol, poly(oxyisobutene)diol, poly(oxydecamethylene), poly(oxyethylene)-dimethyl ether polymers having molecular weights below about 1,500, poly(oxyhexamethylene)diol, poly(oxypropylene)diol, poly(oxypropylene)-dimethyl ether, and poly(oxytetramethylene); polyether copolymers, such as poly(oxyethylene)-poly(oxypropylene)-poly(oxyethylene) block copolymers, oxyethylene-oxypropylene copolymers having greater than about 20 mole percent oxypropylene, oxytetramethylene-oxypropylene copolymers, and block copolymers having oxyethylene-oxypropylene copolymer blocks separated by a poly(oxydimethylsilylene) block; polyamides, such as poly[imino(1-oxodecamethylene)], poly[imino(1-oxododecamethylene)] or nylon 12, poly[imino(1-oxohexamethylene)] or nylon 6, poly[imino(1- oxotetramethylene)] or nylon 4, poly(iminoazelaoyliminononamethylene), poly(iminosebacoyliminodecamethylene), and poly(iminosuberoyliminooctamethylene); polyimines, such as poly[(benzoylimino)ethylene], poly[(butyrylimino)ethylene], poly[(dodecanoylimino)ethylene], (dodecanoylimino)ethylene-(acetyleimino)trimethylene copolymers, poly[(heptanoylimino)ethylene], poly[(hexanoylimino)ethylene], poly{[(3-methyl)butyrylimino]ethylene}, poly[(pentadecafluorooctadecanoylimino)ethylene], and poly[(pentanoylimino)ethylene]; polyurethanes, such as those prepared from methylenediphenyl diisocyanate and butanediol poly(oxytetramethylene) diol, hexamethylene diisocyanate and triethylene glycol, and 4-methyl-1,3-phenylene diisocyanate and tripropylene glycol; polysiloxanes, such as poly(oxydimethylsilylene) and poly(oxymethylphenylsilylene); and cellulosics, such as amylose, amylopectin, cellulose acetate butyrate, ethyl cellulose, hemicellulose, and nitrocellulose.

As used herein, the terms "cationically charged" in reference to a coating on a hydrophobic polymer fiber and "cationic" in reference to the functionalized polymer mean the presence in the coating or polymer of a plurality of positively charged groups. Such charges typically will result from the presence in the coating of a plurality of quaternary ammonium groups, but they are not necessarily limited thereto.

The term "functionalized" is used herein to mean the presence in the cationic polymer of a plurality of functional groups in the cationic polymer, other than the cationic groups, which are capable of crosslinking when subjected to heat. Thus, the functional groups are thermally crosslinkable groups. Examples of such functional groups include epoxy, ethylenimino, and episulfido. These functional groups readily react with other groups typically present in the cationic polymer. The other groups typically have at least one reactive hydrogen atom and are exemplified by amino, hydroxy, and thiol groups. It may be noted that the reaction of a functional group with another group often generates still other groups which are capable of reacting with functional groups. For example, the reaction of an epoxy group with an amino group results in the formation of a βhydroxyamino group.

Thus, the term "functionalized cationic polymer" is meant to include any polymer which contains a plurality of positively charged groups and a plurality of other functional groups which are capable of being crosslinked by the application of heat. Particularly useful examples of such polymers are epichlorohydrin-functionalized polyamines, which polymers include epichlorohydrin-functionalized polyamido-amines. Both types of polymers are exemplified by the Kymene® resins which are available from Hercules Inc., Wilmington, Del. Other suitable materials include cationically modified starches, such as such as RediBond, from National Starch. Desirably, the functionalized cationic polymer will be an epichlorohydrin-functionalized polyamine or an epichlorohydrin-functionalized polyamido-amine.

As used herein, the term "thermally crosslinked" means the coating of the functionalized cationic polymer has been heated at a temperature and for a time sufficient to crosslink the above-noted functional groups. Temperatures typically may vary from about 50° C. to about 150° C. Heating times in general are a function of temperature and the types of functional groups present in the cationic polymer. For example, heating times may vary from about 1 to about 60 minutes or more.

As stated earlier, the present invention provides a hydrophobic polymer fiber having a cationically charged coating thereon, in which the coating includes a functionalized cationic polymer which has been crosslinked by heat. By way of example, the functionalized cationic polymer may be an epichlorohydrin-functionalized polyamine. As another example, the functionalized cationic polymer may be an epichlorohydrin-functionalized polyamido-amine.

The present invention also provides a fibrous filter which includes hydrophobic polymer fibers having a cationically charged coating thereon. The coating includes a functionalized cationic polymer which has been crosslinked by heat. As before, the functionalized cationic polymer is an epichlorohydrin-functionalized polyamine or an epichlorohydrin-functionalized polyamido-amine.

In general, the fibrous filter will contain at least about 50 percent by weight of hydrophobic polymer fibers, based on the weight of all fibers present in the filter. In some embodiments, essentially 100 percent of the fibers will be hydrophobic polymer fibers. When other fibers are present, however, they generally will be cellulosic fibers, glass fibers, or mixtures thereof.

Sources of cellulosic fibers include, by way of illustration only, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie; leaves, such as abaca and sisal; and seeds, such as cotton and cotton linters. Softwoods and hardwoods are the more commonly used sources of cellulosic fibers; the fibers may be obtained by any of the commonly used pulping processes, such as mechanical, chemimechanical, semichemical, and chemical processes. Examples of softwoods include, by way of illustration only, longleaf pine, shortleaf pine, loblolly pine, slash pine, Southern pine, black spruce, white spruce, jack pine, balsam fir, douglas fir, western hemlock, redwood, and red cedar. Examples of hardwoods include, again by way of illustration only, aspen, birch, beech, oak, maple and gum.

The hydrophobic polymer fibers desirably will be fibers prepared from thermoplastic polyolefins, or mixtures thereof. Examples of thermoplastic polyolefins include polyethylene, polypropylene, poly(1-butene), poly(2-butene), poly(1-pentene), poly(2-pentene), poly(3-methyl-1-pentene), poly(4-methyl-1-pentene), and the like. In addition, the term "polyolefins" is meant to include blends of two or more polyolefins and random and block copolymers prepared from two or more different unsaturated monomers. Because of their commercial importance, the most desirable polyolefins are polyethylene and polypropylene.

The fibrous filter (either before or after processing) may have a basis weight ranging from about 6 gsm to about 400 gsm. For example, the fibrous filter may have a basis weight ranging from about 12 gsm to about 250 gsm. Desirably, the fibrous filter may have a basis weight ranging from about 17 gsm to about 102 gsm. However, any number of the fibrous filters of the present invention may be joined together or joined to other materials to form a consolidated material that may have a basis weight within the range of 6 gsm to 400 gsm or even greater (e.g., greater than 400 gsm).

The present invention further provides a method of preparing a fibrous filter. The method involves providing a fibrous filter comprised of hydrophobic polymer fibers; treating the fibrous filter with an aqueous solution of a functionalized cationic polymer crosslinkable by heat under conditions sufficient to substantially coat the fibers with the functionalized cationic polymer, wherein the solution comprises the functionalized cationic polymer, a poly(vinyl alcohol), a polar solvent for the poly(vinyl alcohol), and water; and treating the resulting coated fibrous filter with heat at a temperature and for a time sufficient to crosslink the functionalized cationic polymer present on the hydrophobic polymer fibers. By way of example, the functionalized cationic polymer may be an epichlorohydrin-functionalized polyamine or an epichlorohydrin-functionalized polyamidoamine.

As a practical matter, the aqueous solution of the functionalized cationic polymer typically will include from about 0.1 to about 2 percent by weight of the functionalized cationic polymer, from about 0.1 to about 4 percent by weight of the poly(vinyl alcohol), and from about 10 to about 50 percent by weight of the polar solvent, with the remainder of the solution being water. By way of example, the aqueous solution of the functionalized cationic polymer may include from about 0.2 to about 1 percent by weight of the functionalized cationic polymer, from about 0.1 to about 2 percent by weight of the poly(vinyl alcohol), and from about 15 to about 45 percent by weight of isopropyl alcohol, with the remainder of the solution being water.

Poly(vinyl alcohol) is manufactured commercially by the hydrolysis of poly(vinyl acetate). The physical properties of poly(vinyl alcohol) largely are a function of the degree of hydrolysis and molecular weight. The poly(vinyl alcohol) useful in the present invention is that which generally is referred to as hot water-soluble poly(vinyl alcohol). Such material is highly hydrolyzed, having a degree of hydrolysis of at least about 98 percent. Desirably, the poly(vinyl alcohol) will have a degree of hydrolysis of 99 percent or greater. The molecular weight of the poly(vinyl alcohol) typically will be at least about 10,000, which corresponds approximately to a degree of polymerization of at least about 200. Desirably, the poly(vinyl alcohol) will have a molecular weight of from about 15,000 to about 20,000, which corresponds approximately to a degree of polymerization range of from about 325 to about 435.

In general, the polar solvent may be any organic solvent in which the poly(vinyl alcohol) is partially or completely soluble. Examples of polar solvents include, by way of illustration only, lower alcohols, such as methanol, ethanol, 1-propanol, isopropanol, 1-butanol, isobutanol, and t-butyl alcohol; ketones, such as acetone, methyl ethyl ketone, and diethyl ketone; dioxane; and N,N-dimethylformamide. Desirably, the polar solvent will be isopropyl alcohol.

Finally, the present invention additionally provides a method of preparing a fibrous filter, in which the method includes providing a fibrous filter composed of hydrophobic polymer fibers; passing a solution of a functionalized cationic polymer crosslinkable by heat through the fibrous filter under conditions sufficient to substantially coat the fibers with the functionalized cationic polymer, wherein the solution includes the functionalized cationic polymer, a poly (vinyl alcohol), and water; and treating the resulting coated fibrous filter with heat at a temperature and for a time sufficient to crosslink the functionalized cationic polymer present on the hydrophobic polymer fibers. Again, the functionalized cationic polymer may be an epichlorohydrin-functionalized polyamine or an epichlorohydrin-functionalized polyamido-amine.

Depending upon the functionalized cationic polymer, it may be either desirable or necessary to adjust the pH of the aqueous solution containing the polymer. For example, aqueous solutions of epichlorohydrin-functionalized polyamines or epichlorohydrin-functionalized polyamidoamines desirably have pH values which are basic or slightly acidic. For example, the pH of such solutions may be in a range of from about 6 to about 10. The pH is readily adjusted by means which are well known to those having ordinary skill in the art. For example, the pH may be adjusted by the addition to the polymer solution of typically dilute solutions of a mineral acid, such as hydrochloric acid or sulfuric acid, or an alkaline solution, such as a solution of sodium hydroxide, potassium hydroxide, or ammonium hydroxide.

The solution of the functionalized cationic polymer may be passed through the fibrous filter by any means known to those having ordinary skill in the art. For example, the solution may be "pulled" through the filter by reducing the pressure on the side of the filter which is opposite the side against which the solution has been applied. Alternatively, the solution may be forced through the filter by the application of pressure.

Once the fibers of the filter have been coated with the functionalized cationic polymer, the polymer is crosslinked by the application of heat at a temperature and for a time sufficient to crosslink the functional groups present in the polymer. Temperatures typically may vary from about 50° C. to about 150° C. Heating times in general are a function of temperature and the type of functional groups present in the cationic polymer. For example, heating times may vary from about 1 to about 60 minutes or more.

The present invention is further described by the examples which follow. Such examples, however, are not to be construed as limiting in any way either the spirit or the scope of the present invention. In the examples, all parts and percents are by weight.

EXAMPLE 1

A poly(vinyl alcohol) solution was prepared by heating 0.5 part of poly(vinyl alcohol) (Catalog No. 18,934-0, Aldrich Chemical Company, Milwaukee, Wis., 88 percent hydrolyzed and a weight-average molecular weight of 96,000) in 99.5 parts of water at 85° C. until the polymer had dissolved. The resulting solution was cooled to ambient temperature (about 20°–25° C.), to which an aqueous solution of an epichlorohydrin-functionalized polyamido-amine (Kymene® 450, 20 percent solids, Hercules Inc., Wilmington Del.) and isopropyl alcohol (99.5 percent, HPLC grade, Aldrich Chemical Company) were added in amounts sufficient to provide a final aqueous solution containing 0.35 percent poly(vinyl alcohol), 0.35 percent Kymene® 450, and 29 percent isopropyl alcohol. A meltblown web, 7 inches by 30 inches (about 18 cm by about 76 cm) and having a basis weight of 1 ounce per square yard or osy (about 34 grams per square meter or gsm), was immersed in the final poly(vinyl alcohol) solution until thoroughly wetted (one to two minutes). The saturated web was removed from the solution and air dried. The web then was placed in an oven at 85° C. for one hour to crosslink the epichlorohydrin-functionalized polyamido-amine present on the surfaces of the fibers of which the web was composed.

Six layers of the treated web, cut into one-inch (about 2.5-cm) diameter discs, were placed in a stainless steel syringe holder (25-mm diameter, Catalog No. 1980-002, Whatman Inc., Clifton, N.J.) and challenged with 0.5-micrometer diameter polystyrene latex microparticles (with carboxylic acid functional groups which gave a surface titration value of 7.0 µeq/g) without surfactant (Bangs Laboratory, Inc., Fishers, Ind.) suspended in water at a concentration of 108 particles per ml. The particle suspension was passed through the layered filter by means of a syringe attached to the syringe holder. Greater than 99.9 percent of the particles were removed by the six layers of treated web. Greater than 99.9 percent of the particles were removed by filtering the solution through the web layers which had a combined basis weight of 6 osy (about 203 gsm).

EXAMPLE 2

A poly(vinyl alcohol) solution was prepared by heating 1 part of poly(vinyl alcohol) (Elvanol® 7006, Dupont Chemical, Wilmington Del.) in 99 parts of water at 85° C. until the polymer had dissolved. After the solution had cooled to ambient temperature (20°–25° C.), 50 ml of the solution was thoroughly mixed with 2 ml of an epichlorohydrin-functionalized polyamine solution (Kymene® 2064, 20 percent solids, Hercules Inc., Wilmington, Del.), 30 ml of isopropyl alcohol (99.5 percent, HPLC grade, Aldrich Chemical Company), and 18 ml of deionized water. A 7-inch by 52-inch (about 18-cm by 132-cm) regular polypropylene meltblown web was soaked in 100 ml of the poly(vinyl alcohol)/functionalized cationic polymer solution until it was completely wet by the solution. The web was removed from the solution and passed through a laboratory wringer to remove residual solution. The web was allowed to air dry and then was heated in an oven at 85° C. for one hour to crosslink the epichlorohydrin-functionalized polyamine present on the surfaces of the fibers of which the web was composed.

Circular samples having a diameter of 1.875 inches (about 4.8 cm) were cut from the resulting treated web. A filter consisting of six layers of the circular samples was placed in a 2-inch (about 5.1-cm) diameter Nalgene reusable filter holder (250 ml, Nalgene # 300–4000, Nalge Nunc International, Naperville, Ill.). The filter was washed in the filter holder with five liters of deionized water. The filter capture efficiency then was tested against 100 ml of the 0.5-micrometer diameter polystyrene latex microparticles employed in Example 1. The particle suspension was passed through the filters by gravity. Greater than 90 percent of the particles were removed by filtering the suspension through the layered filter which had a combined basis weight of 6 osy (about 204 gsm).

EXAMPLE 3

A poly(vinyl alcohol) solution was prepared by heating 0.2 part of poly(vinyl alcohol) (Elvanol® 7006, Dupont Chemical, Wilmington Del.) in 99.8 parts of water at 85° C. until the polymer had dissolved. After the solution had cooled to ambient temperature (20°–25° C.), 68 ml of the solution was thoroughly mixed with 2 ml of an epichlorohydrin-functionalized polyamine solution (Kymene® 2064, 20 percent solids, Hercules Inc., Wilmington, Del.). The pH of the resulting solution was adjusted to 10 with an aqueous sodium hydroxide solution, followed by the addition of 30 ml of isopropyl alcohol (99.5 percent, HPLC grade, Aldrich Chemical Company). A 7-inch by 52-inch (about 18-cm by 132-cm) regular polypropylene meltblown web was soaked in 100 ml of the poly (vinyl alcohol)/functionalized cationic polymer solution until it was completely wet by the solution. The web was removed from the solution and passed through a laboratory wringer to remove residual solution. The web was allowed to air dry and then was heated in an oven at 85° C. for one hour to crosslink the epichlorohydrin-functionalized polyamine present on the surfaces of the fibers of which the web was composed.

Circular samples having a diameter of 1.875 inches (about 4.8 cm) were cut from the resulting treated web. A filter consisting of six layers of the circular samples was placed in a 2-inch (about 5.1-cm) diameter Nalgene reusable filter holder (250 ml, Nalgene # 300-4000, Nalge Nunc International, Naperville, Ill.). The filter was washed in the filter holder with four liters of deionized water. The filter capture efficiency then was tested against 100 ml of the 0.5-micrometer diameter polystyrene latex microparticles employed in Example 1. The particle suspension was passed through the filters by gravity. Greater than 99.9 percent of the particles were removed by filtering the suspension through the layered filter which had a combined basis weight of 6 osy (about 204 gsm).

EXAMPLE 4

A poly(vinyl alcohol) solution was prepared by heating 0.2 part of poly(vinyl alcohol) (Elvanol® 7006, Dupont Chemical, Wilmington Del.) in 97 parts of water at 85° C. until the polymer had dissolved. After the solution had cooled to ambient temperature (20°–25° C.), it was thoroughly mixed with 3 ml of the epichlorohydrin-functionalized polyamine solution employed in Example 3 (Kymene® 2064, 20 percent solids, Hercules Inc., Wilmington, Del.). A filter consisting of six layers of a regular meltblown web was prepared, in which each layer was a circular disk having a diameter of 1.875 inches (about 4.8 cm). The filter was placed in a 2-inch (about 5.1-cm) diameter Nalgene reusable filter holder (250 ml, Nalgene # 300-4000, Nalge Nunc International, Naperville). The epichlorohydrin-functionalized polyamine solution prepared above was pulled through the filter over a period of about 10 seconds by reducing the pressure on the downstream side of the filter holder. It was observed that this treatment rendered the web wettable. The filter then was heated in an oven at 85° C. for one hour to crosslink the epichlorohydrin-functionalized polyamine present on the surfaces of the fibers of which the web was composed.

After being heated, the filter was washed first with 4 liters of deionized water and then with 100 ml of a 0.1 percent by weight aqueous sodium chloride solution. The capture efficiency of the filter was tested as described in Example 3. Greater than 99.9 percent of the particles were removed by filtering the solution through treated filter which had a combined basis weight of 6 osy (about 204 gsm).

In the example which follows, meltblown materials treated in accordance with the present invention were tested for coating durability, particle capture efficiencies at different flow velocities, and pathogen capture efficiencies.

EXAMPLE 5

A polypropylene meltblown web having a basis weight of 1 osy (about 34 gsm) was treated essentially as described in the preceding examples. The treatment solution consisted of 400 grams of poly(vinyl alcohol) (Elvanol® 7006, Dupont Chemical, Wilmington Del.), 600 ml of an epichlorohydrin-functionalized polyamine solution (Kymene® 2064, 20 percent solids, Hercules Inc., Wilmington, Del.), and water sufficient to give 22 liters total volume. The solution pH was 7.5 to 8. The web was heated in an oven at 85° C. for one hour to crosslink the epichlorohydrin-functionalized polyamine present on the surfaces of the fibers of which the web was composed.

Particle Capture Efficiencies at Different Flow Velocities

Circular samples having a diameter of 1.875 inches (about 4.8 cm) were cut from the treated web. A filter consisting of six layers of the circular samples was placed in a 2-inch (about 5.1-cm) diameter Nalgene reusable filter holder (250 ml, Nalgene # 300-4000, Nalge Nunc International, Naperville, Ill.). The filter was washed in the filter holder with 100 ml of a 0.1 percent by weight aqueous sodium chloride solution. The filter capture efficiency then was tested against 100 ml of the 0.5-micrometer diameter polystyrene latex microparticles employed in Example 1. The particle suspension was pulled through the filter by the application of controlled reduced pressure. Greater than 99 percent of the particles were removed by filtering the suspension through the layered filter, which had a combined basis weight of 6 osy (about 204 gsm), at suspension flow velocities which varied from 3.8 to 470 ml min$^{-1}$ in$^{-2}$.

Durability of Coating After Large Volume of Tap Water

A filter was constructed by wrapping six layers of the treated meltblown web around a perforated metal core. Each layer had a basis weight of 1 osy (about 34 gsm) and an area of 18.2 in$^2$. The resulting structure was secured in a stainless steel holder which was designed to permit a fluid to flow into the outer surface, through all six layers, and into the metal core. Faucet-pressure tap water, roughly 200 gallons (about 757 liters), was passed through the filter. The structure was removed from the holder and each layer was carefully unwrapped from the metal core. Each meltblown wrap was cut into 3 circles having a diameter of 1.875 inches (about 4.8 cm) and tested for particle capture efficiency under gravity flow as described in the preceding examples; in this case, however, the microparticle suspension contained 2.94× 10$^8$ microparticles per ml. The particle capture efficiencies are summarized in Table 1. In the table, sheet 1 represents the outer-most sheet, while sheet 6 represents the innermost sheet, or the sheet which wrapped first around the metal core.

TABLE 1

Summary of particle Capture Efficiencies

| Sheet | Percent Captured |
|---|---|
| 1 | 74.1 ± 2.3 |
| 2 | 77.0 ± 1.8 |
| 3 | 78.6 ± 3.2 |
| 4 | 72.8 ± 5.0 |
| 5 | 74.1 ± 2.3 |
| 6 | 75.0 ± 0.9 |
| Control | 76.6 ± 1.4 |

From Table 1, it is seen that the average particle capture efficiencies varied from about 73 percent to about 79 percent. If standard deviation values are taken into account, the range is slightly broader, i.e., from about 68 percent to about 82 percent. The control web, i.e., a web which had been treated with the functionalized cationic polymer but not subjected to the tap water washing step, had an average particle capture efficiency of about 77 percent. The data in the table suggest the charge-modified coating is durable since the data were obtained after washing the filter with 200 gallons of tap water.

Pathogen Capture Results

Pathogen filter efficacy is defined herein as the ratio of the number of cells remaining in the filtrate to the number of cells originally present in the pathogen suspension. It is determined by plating samples of both the original suspension and the filtrate on tryptic soy agar (TSA) growth media plates (BBL® TSA plates, BectonDickinson, Cockeyville, Md.) and counting the number of colonies seen after overnight incubation at 37° C. One colony forming unit (CFU) translates to one individual viable cell. While this sounds quite straightforward, such testing is not always without complicating factors. Soluble polycations, such as the functionalized cationic polymer employed in this example, are strongly antimicrobial. Leaching or washing away of the coating will kill any cells in the filtrate. If this occurs, the filters will show artificially high bacterial reduction, due in great part to cell death in solution. Therefore, filter efficacy was determined through a two-part testing protocol, namely, a coating durability test and a filter efficacy assay.

Several layers of the treated polypropylene meltblown web were placed in a filter housing apparatus (Nalgene Filter Holder; Nalgene Inc. Rochester, N.Y.); the average thickness of the layers was 3 mm. To carry out the coating durability test, a 100-ml volume of 0.1 percent sterile saline water was passed over the filter, either by gravity flow or under the influence of reduced pressure. The effluent saline then was contaminated to roughly 10$^5$–10$^6$ cells/ml with bacteria and incubated for thirty minutes. Cell concentrations were determined as described above after overnight culturing at 37° C. Any cell deaths caused by the leaching of the functionalized cationic polymer from the treated webs was apparent by comparing through a comparison with a contaminated control solution, i.e., a contaminated solution which had not been passed through the filter.

The leaching assay or coating durability test is only able to determine detectable amounts of leaching which are related to the sensitivity of a given microorganism to the functionalized cationic polymer. Bacterial sensitivity has been established through a minimal inhibitory concentration study (MIC), or the concentration at which no growth was observed. Table 2 summarizes several MICs for various microorganisms.

TABLE 2

Minimal Inhibitory Concentrations[a] for Selected Polycations

| Organism | Reten ® 201[b] | Kymene ® 450[c] | Kymene ® 2064[d] |
|---|---|---|---|
| V. cholerae | <250 ppm | <33 ppm | <16 ppm |
| E.coli | — | <33 ppm | <16 ppm |
| S. cholerasuis | — | <16 ppm | — |
| K. terrigena | — | — | <16 ppm |
| S. aureus | — | <16 ppm | <8 ppm |

[a]As outlined in Microdilution (Tube) Broth Method, NCCLS, Vol. 13, No. 25, Dec 1993.
[b]A cationic polymer containing quaternary ammonium groups (Hercules Inc., Wilmington, Delaware).
[c]An epichlorohydrin-functionalized polyamido-amine (Hercules Inc., Wilmington, Delaware).
[d]An epichlorohydrin-functionalized polyamine (Hercules Inc., Wilmington, Delaware).

Filter efficacy was determined by challenging the filter with 100 ml of contaminated 0.1percent saline water. Bacterial contamination was controlled and set to 10$^5$–10$^6$ cells/ml. Flow through the filter was either by gravity flow or under the influence of reduced pressure. As with the coating durability test, the effluent saline was incubated for thirty minutes. Cell concentrations were determined as described above after plating and overnight culturing at 37° C. The results were compared to the plate counts for the original suspension and recorded as a log reduction. The variables studied included type of microorganism, flow rates through the filter, and suspension pH. The results are summarized in Tables 3–5, inclusive.

TABLE 3

Filtration Efficacies for Different Microorganisms

| Microorganism | Log Reduction | Leaching |
|---|---|---|
| K. terrigena (ATCC 33257)[a] | 3.51 ± 0.3[b] | None |
| E.coli (ATCC 13706 | 3.36 ± 0.3 | None |

[a]EPA test microorganism.
[b]This represents a complete reduction (or removal) of micro-organisms from the suspension by the filter.

TABLE 4

Filtration Efficacies for E. coli at Different Flow Velocities

| Flow Velocity | Log Reduction | Leaching |
|---|---|---|
| 5 ml min$^{-1}$ in$^{-2}$ | ≧3.5 | None |
| 10 ml min$^{-1}$ in$^{-2}$ | ≧3.5 | None |
| 15 ml min$^{-1}$ in$^{-2}$ | ≧3.5 | None |
| 20 ml min$^{-1}$ in$^{-2}$ | ≧3.5 | None |
| 50 ml min$^{-1}$ in$^{-2}$ | ≧3.5 | None |

TABLE 5

Filtration Efficacies for K. terragena at Different pH Values

| pH | Log Reduction | Leaching |
|---|---|---|
| 6.55 | 4.53 ± 0.12 | None |
| 7.55 | 3.51 ± 0.3 | None |
| 8.53 | 3.18 ± 0.12 | None |

The data in Tables 3–5 suggest the following:

small differences in filtration efficacies may exist for different microorganisms with a given filter (it must be recognized, however, that such differences probably can be eliminated by optimizing a filter material for a given microorganism);

within the range studied, filtration efficacy is not dependent upon the velocity of the flow through the filter; and for the microorganism studied, filtration efficacy is dependent upon the pH of the liquid being filtered; this effect was expected since the net charge of the microorganism is pH dependent.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A fibrous filter comprising hydrophobic polymer fibers having a cationically charged coating thereon, the coating comprising:

a polyvinyl alcohol and a functionalized cationic polymer which have been crosslinked by heat.

2. The fibrous filter of claim 1, in which the functionalized cationic polymer is an epichlorohydrin-functionalized polyamine.

3. The fibrous filter of claim 2, in which the functionalized cationic polymer is an epichlorohydrin-functionalized polyamido-amine.

* * * * *